(12) United States Patent
Lienkamp et al.

(10) Patent No.: US 7,537,848 B1
(45) Date of Patent: May 26, 2009

(54) METHOD FOR MODEL BASED EXHAUST MIXING CONTROL IN A FUEL CELL APPLICATION

(75) Inventors: Sebastian Lienkamp, Budenheim (DE); Peter Willimowski, Rossdorf (DE)

(73) Assignee: GM Global Technology Operations, Inc., Detroit, MI (US)

( * ) Notice: Subject to any disclaimer, the term of this patent is extended or adjusted under 35 U.S.C. 154(b) by 23 days.

(21) Appl. No.: 11/936,642

(22) Filed: Nov. 7, 2007

(51) Int. Cl.
*H01M 8/04* (2006.01)
(52) U.S. Cl. .............................. 429/13; 429/22; 429/23
(58) Field of Classification Search ........................ None
See application file for complete search history.

(56) References Cited

U.S. PATENT DOCUMENTS

| 6,849,352 | B2 | 2/2005 | Formanski et al. |
| 2006/0068243 | A1 | 3/2006 | Lienkamp |
| 2008/0145720 | A1* | 6/2008 | Sinha et al. ..................... 429/13 |
| 2008/0182142 | A1* | 7/2008 | Gade et al. ..................... 429/23 |

OTHER PUBLICATIONS

Lienkamp et al., S., U.S. Utility Patent Application entitled "Control of Nitrogen Fraction in a Flow Shifting Fuel Cell System", U.S. Appl. No. 11/612,108, filed Dec. 12, 2006.

* cited by examiner

*Primary Examiner*—John S Maples

(57) ABSTRACT

A system and method for controlling a bleed valve and a compressor in a fuel cell system during an anode exhaust gas bleed so as to maintain the concentration of hydrogen within a mixed cathode exhaust gas and anode gas below a predetermined percentage. The system uses a valve orifice model to calculate the flow rate of the anode exhaust gas through the bleed valve to identify how much airflow from the compressor is required to dilute the hydrogen in the anode gas to be below the predetermined percentage. The system also uses sensor inaccuracies and production tolerances in the valve orifice model to ensure that the concentration of hydrogen in the mixed anode and cathode exhaust gas is below the determined percentage.

21 Claims, 2 Drawing Sheets

METHOD FOR MODEL BASED EXHAUST MIXING CONTROL IN A FUEL CELL APPLICATION

BACKGROUND OF THE INVENTION

1. Field of the Invention

This invention relates generally to a system and method for controlling a nitrogen bleed from an anode sub-system in a fuel cell system and, more particularly, to a system and method for controlling a nitrogen bleed from an anode sub-system in a fuel cell system, where the method includes mixing the anode bleed gas with a cathode exhaust gas, and controlling the cathode input air based on the concentration of hydrogen in the anode bleed gas so as to maintain the concentration of hydrogen in the combined cathode and anode exhaust gas below a certain percentage.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode gas output of the fuel cell stack to remove nitrogen from the anode side of the stack.

The gas that is periodically bled from the anode side typically includes a considerable amount of hydrogen. Because the hydrogen will mix with air if it is vented to be in the environment, a potential combustible mixture may occur which provides obvious safety concerns. It is known in the art to direct the bled gas to a combustor to burn most or all of the hydrogen therein before the bled gas is exhausted to the environment. However, the combustor adds a significant cost and complexity to the fuel cell system, which is undesirable.

It is also known in the art to eliminate the combustor and directly mix the anode bleed gas with the cathode exhaust gas. If the anode bleed gas is directly mixed with the cathode exhaust gas without control, the amount of hydrogen in the anode exhaust gas is unknown. A hydrogen concentration sensor can be provided in the cathode exhaust gas line after the mixing point with the anode bleed gas to detect the concentration of hydrogen. The hydrogen concentration sensor would provide a signal to the controller during the bleed indicative of the concentration of hydrogen in the mixed exhaust gas. If the concentration of hydrogen was to high, the controller would increase the speed of the compressor to provide more cathode exhaust air to lower the concentration of hydrogen. If the compressor was unable to effectively keep the concentration of hydrogen below the safe limit for the stack load, then the controller would have to close the bleed valve. However, the hydrogen sensor would have to be inexpensive and be able to withstand the humidity of the exhaust gas. Currently, known hydrogen concentration sensors are unable to fulfill these requirements.

SUMMARY OF THE INVENTION

In accordance with the teachings of the present invention, a system and method are disclosed for controlling a bleed valve and a compressor in a fuel cell system during an anode bleed so as to maintain the concentration of hydrogen within a mixed cathode exhaust gas and anode bleed gas below a predetermined percentage. The system uses a valve orifice model to calculate the flow rate of the anode bleed gas through the bleed valve to identify how much airflow from the compressor is required to dilute the hydrogen in the mixed gas to be below the predetermined percentage. The system also takes sensor inaccuracies and production tolerances into account to ensure that the concentration of hydrogen in the mixed anode and cathode exhaust gas is below the determined percentage.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling an anode bleed in a fuel cell system is merely exemplary in nature, and is in no way intended to limit the invention or its applications or uses.

Figure 1:
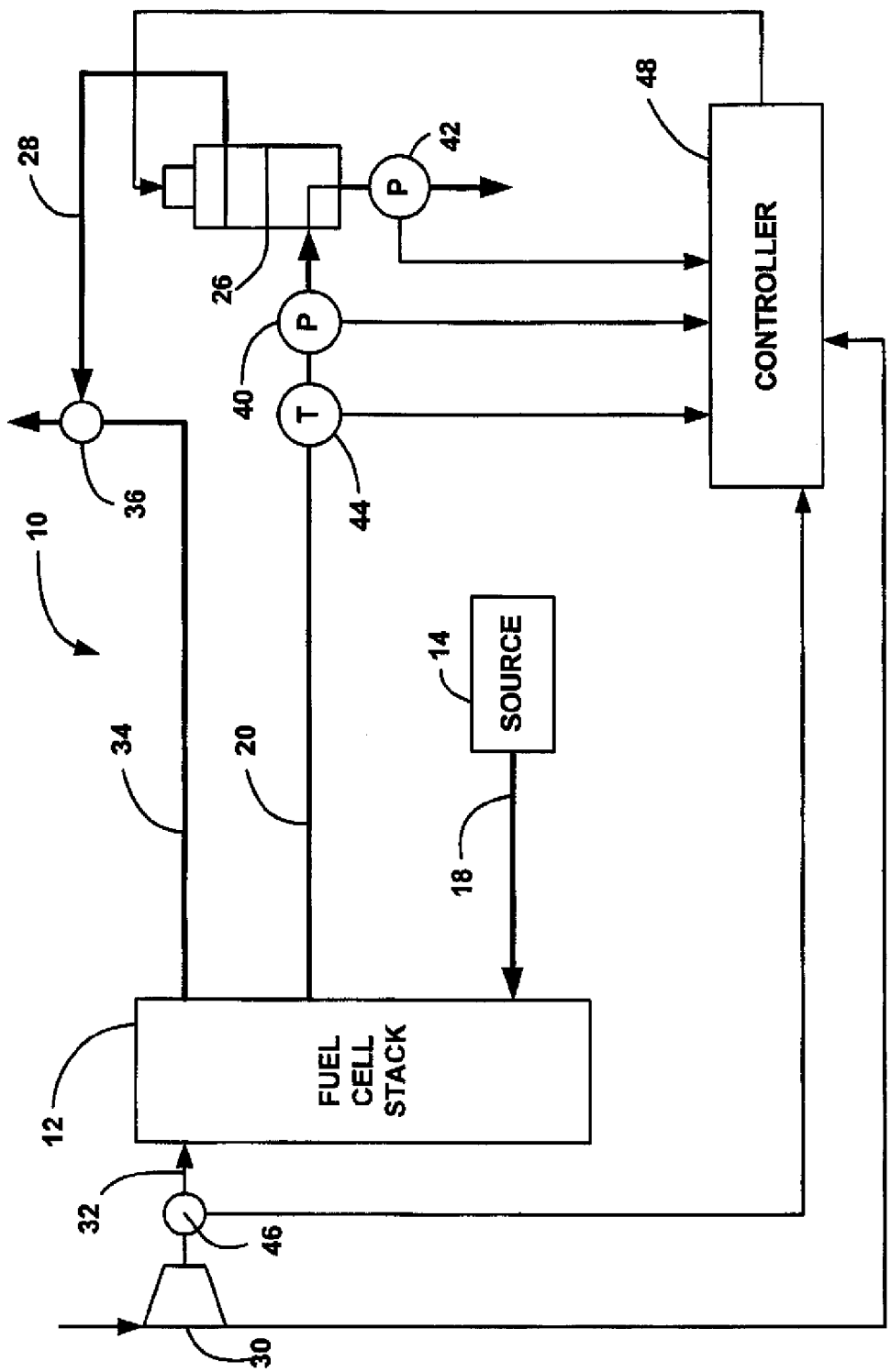
FIG. 1 is a block diagram of a fuel cell system employing a technique for controlling an anode bleed, according to an embodiment of the present invention.

FIG. 1 is a schematic block diagram of a fuel cell system 10 including a fuel cell stack 12. The fuel cell system 10 is intended to generally represent any type of fuel cell system that requires an anode exhaust gas bleed to remove nitrogen from the anode side of the stack 12, such as fuel cell systems that recirculate the anode exhaust gas back to the anode inlet and fuel cell systems that employ a split stack design with anode flow shifting. Hydrogen gas from a hydrogen source 14 is provided to the anode side of the fuel cell stack 12 on line 18. An anode exhaust gas is output from the fuel cell stack 12 on line 20 and is sent to a bleed valve 26. A cathode exhaust gas from the stack 12 is output from the stack 12 on cathode exhaust gas line 34.

As discussed above, nitrogen cross-over from the cathode side of the fuel cell stack 12 dilutes the hydrogen in the anode side that affects stack performance. Therefore, it is necessary to periodically bleed the anode exhaust gas to reduce the amount of nitrogen in the anode sub-system. In this embodiment, the bled gas in the line 28 is mixed with the cathode exhaust gas on line 34 in a mixing junction 36.

In order to monitor the anode sub-system, various sensors are provided in the system 10. Particularly, a pressure sensor 40 measures the pressure at the inlet to the bleed valve 26, a pressure sensor 42 measures the delta pressure across the bleed valve 26 and a temperature sensor 44 measures the temperature of the anode exhaust gas at the inlet to the bleed valve 26. The pressure sensor 40 can be any pressure sensor that measures the pressure of the anode sub-system, and a stack coolant temperature sensor can be used instead of the temperature sensor 44. Further, a flow meter 46 measures the flow of air being input to the cathode side of the fuel cell stack 12. In an alternate embodiment, the flow meter can be eliminated and the flow rate of the compressor air can be derived based on various factors, such as a compressor map, compressor speed, inlet/outlet pressure, temperature, etc.

As discussed above, it is necessary to control the bleed of the anode exhaust gas to the cathode exhaust gas line 34 so that the concentration of hydrogen therein is maintained below a predetermined safe level. Typically, it is desirable to maintain the percentage of hydrogen in the mixed anode and cathode exhaust gas to be less than a few percent by volume. In order to perform this function, a controller 48 receives the temperature signal from the temperature sensor 44, the pressure signal from the pressure sensor 40, the pressure signal from the pressure sensor 42 and the flow signal from the flow meter 46. The controller 48 includes an algorithm, discussed below, that determines the concentration and the amount of hydrogen being bled from the bleed valve 26, and controls the compressor 30 and the bleed valve 26 to maintain the concentration of hydrogen in the combined exhaust gas below a predetermined level.

The algorithm calculates the concentration of hydrogen that is being vented to the atmosphere. This concentration of hydrogen is based on the cathode exhaust gas flow and the anode exhaust gas flow. The cathode gas flow is provided by the flow meter 46. According to one embodiment of the present invention, the anode exhaust gas flow is calculated based on an orifice model of the bleed valve 26. The actual mole fractions of nitrogen, hydrogen and water vapor in the anode exhaust gas is calculated based on the assumption that the water fraction is about 100% relative humidity for the measured temperature. The dry hydrogen mole fraction can be estimated by evaluating cell voltages, making use of specific sensors or setting the hydrogen mole fraction to 1 as a worst case assumption.

Figure 2:
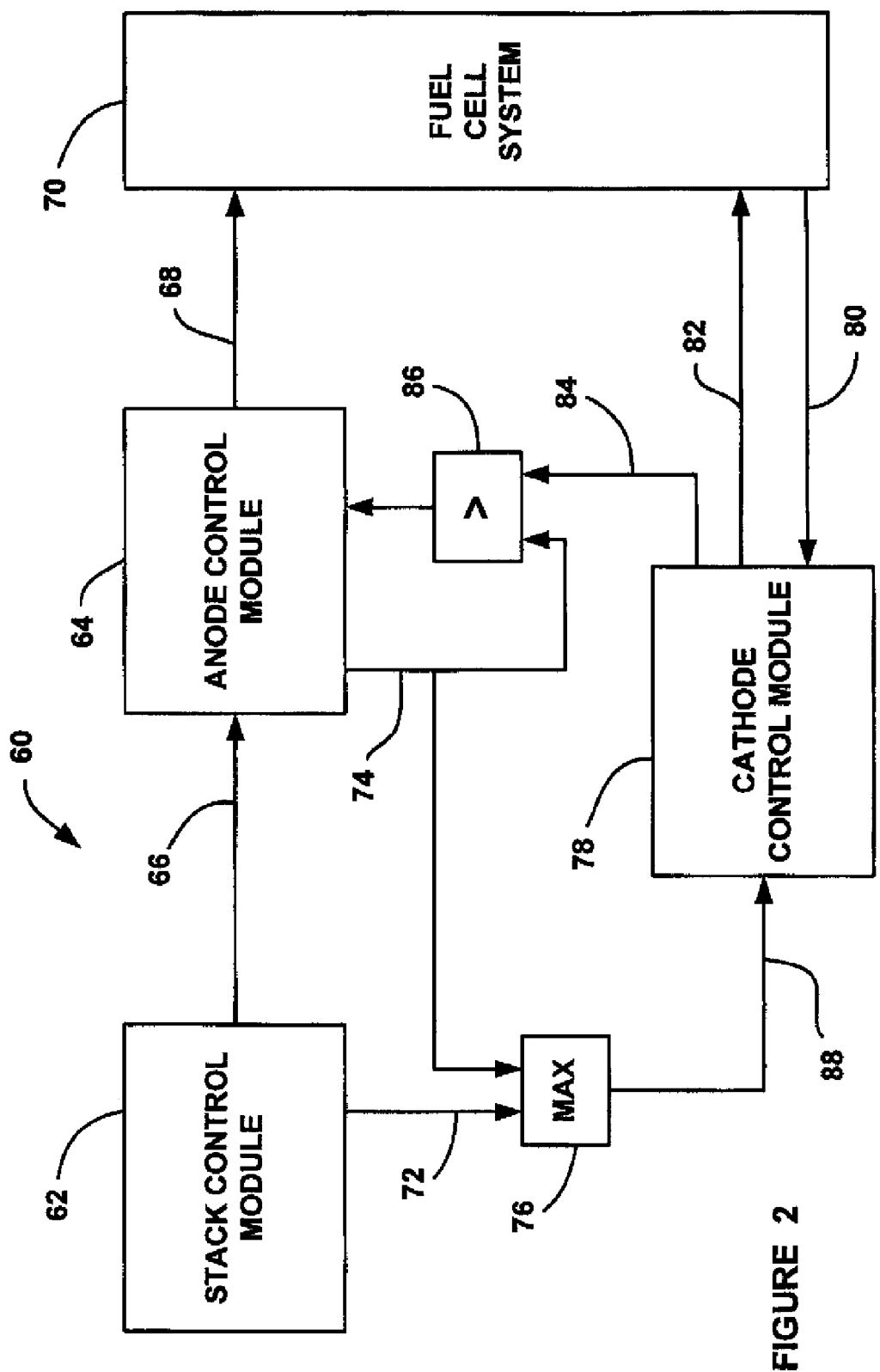
FIG. 2 is a block diagram of a control scheme for controlling a bleed valve in the system shown in FIG. 1.

FIG. 2 is a block diagram of a system 60 for controlling the bleed valve 26 and the compressor 30 during an anode exhaust gas bleed, according to an embodiment of the present invention. The system 60 includes a stack control module 62 that generates a bleed request signal on line 66 at those times it is necessary for the bleed valve 26 to be opened to reduce the amount of nitrogen in the anode exhaust gas. Various techniques for determining when to bleed the anode exhaust gas are known in the art, some of which model the concentration of nitrogen in the anode exhaust gas. For example, U.S. patent application Ser. No. 10/952,200, filed Sep. 28, 2004 entitled Method for Controlling Nitrogen Fraction discloses one such system. The stack control module 62 also calculates the cathode airflow request for the current stack load and provides a stack airflow request signal on line 72.

The bleed request signal is sent to an anode control module 64 that provides a bleed command signal on line 68 to a bleed valve in a fuel cell system 70. The anode control module 64 uses a valve model to calculate the hydrogen that will flow through the bleed valve 26 and mix with the cathode exhaust gas. The anode control module 64 adjusts the differential pressure across the bleed valve 26 to control the anode exhaust gas flow therethrough during the bleed by controlling the opening of the valve 26. The anode control module 64 also generates an airflow request signal on line 74 that needs to be provided to dilute the hydrogen in the anode exhaust gas during the bleed so that the percentage of hydrogen in the mixed exhaust gas is below the predetermined safety level.

Both of the airflow request signals on the lines 72 and 74 are sent to a maximum processor 76 that takes the larger of the two values, and sends it to a cathode control module 78 on line 88. The cathode control module 78 also receives a measured cathode airflow signal on line 80 from the flow sensor 46 indicating the actual airflow from the compressor 30. The cathode control module 78 generates a compressor command signal that is sent to the fuel cell system 70 on line 82 for controlling the speed of the compressor 30. The compressor command signal will satisfy both the stack load requirement and the amount of air at the mixing junction 36 that is necessary to dilute the hydrogen below the predetermined safety level during the nitrogen bleed.

In order to assure a worst-case estimation of the hydrogen concentration in the mixed exhaust gas, the cathode control module 78 provides a guaranteed airflow signal on line 84 that takes potential sensor inaccuracies and production tolerances into consideration. The guaranteed airflow signal considers airflow and model accuracies, production tolerances, mass flow splits between the main airflow to the cathode inlet of the stack 12 and to the mixing junction 36, etc. The guaranteed airflow signal on the line 84 and the airflow request signal on the line 74 are compared in the comparator 86. If the airflow request signal is smaller than the guaranteed airflow signal, the hydrogen concentration limit will not be exceeded, and the bleed valve 26 can be opened. Otherwise, the anode control module 64 will not open the bleed valve 26.

As mentioned above, the stack control module 62 can request a nitrogen bleed using various techniques. In one embodiment, the bleed valve 26 is opened if the following equation is true.

$$x_{H_2,Offgas,max} > \frac{dn_{H_2,An,Out}}{dn_{N_2,An,Out} + dn_{N_2,Cath,Out} + dn_{O_2,Cath,Out} + dn_{H_2,An,Out} + dn_{H_2O,Cath,Out,Vap} + dn_{H_2O,An,Out,Vap}} \quad (1)$$

Where:

$$dn_{N_2,Cath,Out} = \frac{x_{N_2,Cath,In} * dm_{Air,Cath,In}}{M_{Air}} - dn_{N_2,Cath,ToAnPermeation} \quad (2)$$

$$dn_{H_2O,Cath,Out,Vap} = 0 \quad (3)$$

Where equation (3) is a worst case assumption that all of the water is condensed.

$$dn_{O_2,Cath,Out} = \frac{x_{O_2,Cath,In} * dm_{Air,Cath,In}}{M_{Air}} - \frac{I * n}{2 * Q_e * N_a} \quad (4)$$

Where d is a derivative with respect to time.

As mentioned above, the anode control model 64 uses a valve model to calculate the hydrogen that is bled from the bleed valve 26. According to one embodiment of the present invention, the valve model uses the following equation to provide the calculation.

$$Q = 1.0219 * kv * \sqrt{\frac{\rho_n * (p_1^2 - p_2^2)}{T}} \quad (5)$$

Where kv is the characteristic value for the bleed valve 26, Q is the flow rate of the anode exhaust gas flowing through the bleed valve 26, $p_1$ is the pressure at the inlet of the bleed valve 26, $p_2$ is the pressure at the outlet of the bleed valve 26, $\rho_n$ is the density of the anode exhaust gas and T is the temperature of the anode exhaust gas.

Because the hydrogen concentration in the mixed anode and cathode exhaust gas cannot be higher than the predetermined limit, the parameters and sensor signals should be chosen in a way that the anode exhaust gas flow $Q_{calculated}$ would be higher or equal to the real unknown anode exhaust gas flow $Q_{real}$. This results in the following worst case assumptions for equation (5).

$$kv_{worst\_case} = kv_{real} + \Delta kv_{tolerance} \quad (6)$$

$$T_{worst\_case} = T_{real} - \Delta T_{tolerance} \quad (7)$$

$$p_{1,worst\_case} = p_{1,real} + p_{1,tolerance} \quad (8)$$

$$p_{2,worst\_case} = p_{2,real} + p_{2,tolerance} \quad (9)$$

The flow rate of the anode exhaust gas through the bleed valve 26 can be calculated in other ways. According to another embodiment of the invention, the flow rate through the bleed valve 26 is calculated as:

$$dn_{BleedValve,An,Out} = 27.778 * C_v * \sqrt{\frac{p_1^2 - p_2^2}{T_1 * \frac{M_{Bleed}}{M_{Air}}}} \quad (10)$$

Due to sensor accuracy, the outlet pressure $p_2$ is replaced by a delta pressure $\Delta p_{BleedValve}$ with:

$$p_2 = (p_1 - \Delta p_{BleedValve})^2 \quad (11)$$

Which leads to:

$$dn_{BleedValve,An,Out} = 27.778 * C_v * \sqrt{\frac{\Delta p_{BleedValve} * (2 * p_1 - \Delta p_{BleedValve})}{T_1 * \frac{M_{Blood}}{M_{Air}}}} \quad (12)$$

Where:

$$M_{Bleed} = \sum_{i=1}^{3} M_i * x_{i,Bleed} = M_{H_2} * x_{H_2,Bleed} + M_{N_2} * x_{N_2,Bleed} + M_{H_2O} * x_{H_2O,Bleed} \quad (13)$$

$$dn_{H_2,An,Out} = dn_{BleedValve,An,Out} * x_{H_2,Bleed} \quad (14)$$

$$dn_{N_2,An,Out} = dn_{BleedValve,An,Out} * x_{N_2,Bleed} \quad (15)$$

$$dn_{H_2O,An,Out,Vap} = dn_{BleedValve,An,Out} * x_{H_2O,Bleed} \quad (16)$$

All of the water fractions and flows referred to in the equations above are for vaporized water.

The following assumptions are made for the flow rate calculation above.

$$x_{H_2,Bleed} = 1 \quad (17)$$

Equation (17) is for the worst case where the anode exhaust gas is pure $H_2$, but will be less than 1 if better information is available. If equation (17) is assumed to be 1, then equations (18) and (19) below are:

$$x_{N_2,Bleed} = 0 \quad (18)$$

If it is assumed that the hydrogen fraction is 1, then all of the otherfractions in the bled gas are assumed to be 0. Equation (18) is for the worst case where the anode exhaust gas is pure $H_2$, but will be more than 0 if better information is available.

$$x_{H_2O,Bleed} = 0 \quad (19)$$

Equation (19) is for the worst case where the anode exhaust gas is pure $H_2$, but will be greater than 0 if better information is available.

$$C_v = C_{V\_ValveDesign} + C_{v\_DesignTolerance} \quad (20)$$

Where $C_v$ is a known value.

$$T_1 = T_{SensorReading} - T_{SensorTolerance} \quad (21)$$

Where $T_1$ is the temperature sensor reading and includes data sheet information.

$$p_1 = p_{SensorReading} + p_{SensorTolerance} \quad (22)$$

Where $p_1$ is the pressure sensor reading and includes data sheet information.

$$\Delta p_{BleedValve} = \Delta p_{SensorReading} + \Delta p_{SensorTolerance} \quad (23)$$

Where $\Delta p$ is the delta pressure sensor reading and includes data sheet information.

The various values used in the equations above are defined as:

$C_v$ is the characteristic value of a valve [gal/min];

$p_1$ is the absolute value of the up stream pressure of the anode bleed valve 26 [kPa];

$p_2$ is the absolute value of the downstream pressure of the anode bleed valve 26 [kPa];

$T_1$ is the gas temperature at the anode bleed valve inlet [K];

$\Delta p_{BleedValve}$ is the pressure difference over the anode bleed valve 26 [kPa];

$M_{Bleed}$ is the molar weight of the anode bleed flow [g/mol];

$M_i$ is the molar weight of species $i=N_2,H_2,H_2O$ [g/mol];

$x_{i,Bleed}$ is the mole fraction of species i in the anode bleed gas;

$dm_{Air,Cath,In}$ is the measured air mass flow at stack cathode inlet—tolerance of mass flow sensor;

$dn_{H_2,An,Out}$ is the hydrogen flow at the stack anode outlet [mol/s];

$dn_{N_2,An,Out}$ is the nitrogen flow at the stack anode outlet [mol/s];

$dn_{N_2,Cath,Out}$ is the nitrogen flow at the stack anode outlet [mol/s];

$dn_{O_2,Cath,Out}$ is the oxygen flow at the stack anode outlet [mol/s];

$dn_{N_2,CathToAnPermeation}$ is the nitrogen flow permeating from the stack cathode side through membrane(s) into the stack anode side [mol/s];

$dn_{H_2O,Chat,Out}$ is the vaporized water stream at the stack cathode outlet [mol/s];

$dn_{H_2O,An,Out}$ is the vaporized water stream at the stack anode outlet [mol/s];

I is the stack current [A] and tolerance of sensor;

n is the number of cells in the stack;

$Q_e$ is the elementary charge (1.6022 e-19 Coulomb);

$N_a$ is the Avagadro Constant (6.022 e23);

$M_{Air}$ is the maximum molar weight of air at all ambient conditions in which vehicle operation is possible [g/mol];

$x_{O_2,Cath,In}$ is the minimum molar fraction of oxygen in air at all ambient conditions in which vehicle operation is possible;

$x_{N_2,Cath,In}$ is the minimum molar fraction of nitrogen in air at all ambient conditions in which vehicle operation is possible; and $x_{H_2,Offgas,Max}$ is the maximum allowed molar fraction of hydrogen in the air at end of the vehicle tailpipe.

The value $dn_{N_2,CathToAnPermeation}$ is dependant on the stack temperature and the nitrogen partial pressure and can be calculated by membrane permeation models. The value $dn_{H_2O,Cath,Out,Vap}=0$ could be replaced by a better value if this stream is known exactly.

The desired air mass flow can be calculated as:

$$dm_{Air,Cath,In,des} = M_{Air} * \left(\frac{1}{1-x_{H_2O,Cath,In}}\right) * \quad (24)$$

$$\left(dmol_{H2,An,Out} * \left(\frac{1}{x_{H2,Offgas,Max}} - 1\right) - dn_{N_2,An,Out} - dn_{H_2O,An,Out} - dn_{H_2O,Cath,Out,Vap} + \frac{I*n}{2*Q_e*N_a} + dn_{N2,CathToAnPermeation}\right)$$

Where $dm_{Air,Cath,In,des}$ is the desired air mass flow at the cathode inlet and $x_{H_2O,Cath,In}$ is the maximum molar fraction of water in air at all ambient conditions in which vehicle operation is possible. Water is not taken into account because it may condense before the exhaust gas leaves the tailpipe. If the content of vaporized water at the end of the tailpipe is known it could be integrated into the formula to reduce the airflow command.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack including a cathode side and an anode side;
    a compressor providing an airflow to the cathode side of the fuel cell stack;
    a bleed valve for periodically bleeding anode exhaust gas from the anode side of the stack;
    a mixing junction for mixing a cathode exhaust gas and the bled anode exhaust gas during the bleed; and
    a controller for controlling the compressor and the bleed valve so that the concentration of hydrogen in the mixed anode and cathode exhaust gas is below a predetermined percentage, said controller using a valve orifice model to calculate the flow rate of the anode exhaust gas through the bleed valve to identify how much airflow from the compressor is required to dilute the hydrogen in the anode exhaust gas to be below the predetermined percentage.

2. The system according to claim 1 wherein the controller raises the compressor airflow to allow operation of the bleed valve in the event that the cathode airflow to the stack is below a predetermined value.

3. The system according to claim 1 further comprising a first pressure sensor for measuring the pressure of the anode exhaust gas, a second pressure sensor for measuring the delta pressure across the bleed valve and a temperature sensor for measuring the temperature of the anode exhaust gas, said controller using the measured pressures and the temperature for calculating the flow rate of the anode exhaust gas through the bleed valve.

4. The system according to claim 3 wherein the controller uses sensor inaccuracies and production tolerances in the valve orifice model to ensure that the concentration of hydrogen in the mixed anode and cathode exhaust gas is below the determined percentage.

5. The system according to claim 1 wherein the controller calculates the flow rate of the anode exhaust gas by the equation:

$$Q = 1.0219 * kv * \sqrt{\frac{\rho_n * (p_1^2 - p_2^2)}{T}}$$

where kv is the characteristic value for the bleed valve, Q is the flow rate of the anode exhaust gas flowing through the bleed valve, $p_1$ is the pressure at the inlet of the bleed valve, $p_2$ is the pressure at the outlet of the bleed valve, $\rho_n$ is the density of the anode gas and T is the temperature of the anode exhaust gas.

6. The system according to claim 1 wherein the controller calculates the flow rate of the anode exhaust gas by the equation:

$$dn_{BleedValve,An,Out} = 27.778 * C_v * \sqrt{\frac{p_1^2 - p_2^2}{T_1 * \frac{M_{Bleed}}{M_{Air}}}}$$

where $C_v$ is the characteristic value for the bleed valve, $dn_{BleedValve,An,Out}$ is the flow rate of the anode exhaust gas flowing through the bleed valve, $p_1$ is the pressure at the inlet of the bleed valve, $p_2$ is the pressure at the outlet of the bleed valve, $M_{Bleed}$ is the molar weight of the anode exhaust gas, $M_{Air}$ is the maximum molar weight of air and T is the temperature of the anode exhaust gas.

7. A method for limiting the concentration of hydrogen in a mixed cathode and anode exhaust gas from a fuel cell stack, said method comprising:
periodically bleeding an anode exhaust gas to be mixed with the cathode exhaust gas from the stack; and
controlling a compressor and a bleed valve so that the concentration of hydrogen in the mixed anode and cathode exhaust gas is below a predetermined percentage, wherein controlling a compressor and a bleed valve includes using a valve orifice model to calculate the flow rate of the anode exhaust gas through the bleed valve to identify how much airflow from the compressor is required to dilute the hydrogen in the anode exhaust gas to be below the predetermined percentage.

8. The method according to claim 7 wherein controlling a compressor and a bleed valve includes increasing the compressor airflow to allow the bleed valve to be opened in the event that an airflow to the stack is below a predetermined value.

9. The method according to claim 7 further comprising measuring the pressure of the anode exhaust gas, measuring the delta pressure across the bleed valve and measuring the temperature of the anode exhaust gas, wherein controlling a compressor and a bleed valve includes using the measured pressures and the temperature for calculating the flow rate of the anode exhaust gas through the bleed valve.

10. The method according to claim 9 wherein controlling a compressor and a bleed valve includes using sensor inaccuracies and production tolerances in the valve orifice model to ensure that the concentration of hydrogen in the mixed anode and cathode exhaust gas is below the determined percentage.

11. The method according to claim 7 wherein controlling a compressor and a bleed valve includes using the equation:

$$Q = 1.0219 * kv * \sqrt{\frac{\rho_n * (p_1^2 - p_2^2)}{T}}$$

where kv is the characteristic value for the bleed valve, Q is the flow rate of the anode exhaust gas flowing through the bleed valve, $p_1$ is the pressure at the inlet of the bleed valve, $p_2$ is the pressure at the outlet of the bleed valve, $\rho_n$ is the density of the anode exhaust gas and T is the temperature of the anode exhaust gas.

12. The method according to claim 7 wherein controlling a compressor and a bleed valve includes using the equation:

$$dn_{BleedValve,An,Out} = 27.778 * C_v * \sqrt{\frac{p_1^2 - p_2^2}{T_1 * \frac{M_{Bleed}}{M_{Air}}}}$$

where $C_v$ is the characteristic value for the bleed valve, $dn_{BleedValve,An,Out}$ is the flow rate of the anode exhaust gas flowing through the bleed valve, $p_1$ is the pressure at the inlet of the bleed valve, $p_2$ is the pressure at the outlet of the bleed valve, $M_{Bleed}$ is the molar weight of the anode exhaust gas, $M_{Air}$ is the maximum molar weight of air and T is the temperature of the anode exhaust gas.

13. A fuel cell system comprising:
a fuel cell stack including a cathode side and an anode side;
a compressor providing an airflow to the cathode side of the fuel cell stack;
an airflow sensor receiving the airflow from the compressor and providing a flow signal;
a bleed valve for periodically bleeding anode exhaust gas from the anode side of the stack;
a mixing junction for mixing a cathode exhaust gas and the bled anode exhaust gas during the bleed; and
a controller sub-system for controlling the compressor and the bleed valve so that the concentration of hydrogen in the mixed anode and cathode exhaust gas is below a predetermined percentage, said controller sub-system including a stack control module for generating a first airflow request signal to open the bleed valve, said controller sub-system further including an anode control module receiving the first airflow request signal and providing a bleed command signal to the bleed valve to open the bleed valve to provide the bleed, said anode control module providing a second airflow request signal that identifies how much airflow from the compressor is required to dilute the hydrogen in the anode exhaust gas to be below the predetermined percentage, said controller sub-system comparing the first airflow request signal from the stack control module and the second airflow request signal from the anode control module and selecting the larger of the two, said controller sub-system further including a cathode control module that receives the larger of the first and second airflow request signals and receives the flow signal of the airflow from the airflow sensor, said cathode control module providing a signal to control the speed of the compressor to maintain the hydrogen concentration below the predetermined level during an anode exhaust gas bleed.

14. The system according to claim 13 wherein the controller sub-system compares a guaranteed airflow signal from the cathode control module and the second airflow request signal from the anode control module so that the anode control module knows not to open the bleed valve if the guaranteed airflow signal is less than the airflow signal requested by the anode control module.

15. The system according to claim 13 further comprising a first pressure sensor for measuring the pressure of the anode exhaust gas, a second pressure sensor for measuring the delta pressure across the bleed valve and a temperature sensor for measuring the temperature of the anode exhaust gas, said anode control module using the measured pressures and the temperature for calculating the airflow request signal.

16. The system according to claim 15 wherein the anode control module considers sensor inaccuracies and production tolerances when calculating the second airflow request signal to ensure that the concentration of hydrogen in the mixed anode and cathode exhaust gas is below the predetermined percentage.

17. The system according to claim 13 wherein the anode control module uses a valve orifice model to calculate the second airflow request signal.

18. The system according to claim 17 wherein the valve orifice model calculates the flow rate of the anode exhaust gas through the bleed valve.

19. The system according to claim 18 wherein the flow rate of the anode exhaust gas is calculated by the equation:

$$Q = 1.0219 * kv * \sqrt{\frac{\rho_n * (p_1^2 - p_2^2)}{T}}$$

where kv is the characteristic value for the bleed valve, Q is the flow rate of the anode gas flowing through the bleed valve, $p_1$ is the pressure at the inlet of the bleed valve, $p_2$ is the pressure at the outlet of the bleed valve, $\rho_n$ is the density of the anode exhaust gas and T is the temperature of the anode exhaust gas.

20. The system according to claim 18 wherein the flow rate of the anode exhaust gas is calculated by the equation:

$$dn_{BleedValve,An,Out} = 27.778 * C_v * \sqrt{\frac{p_1^2 - p_2^2}{T_1 * \frac{M_{Bleed}}{M_{Air}}}}$$

where $C_v$ is the characteristic value for the bleed valve, $dn_{BleedValve,An,Out}$ is the flow rate of the anode exhaust gas flowing through the bleed valve, $p_1$ is the pressure at the inlet of the bleed valve, $p_2$ is the pressure at the outlet of the bleed valve, $M_{Bleed}$ is the molar weight of the anode exhaust gas, $M_{Air}$ is the maximum molar weight of air and T is the temperature of the anode exhaust gas.

21. The system according to claim 13 wherein the controller sub-system raises the compressor airflow to allow operation of the bleed valve in the event that the cathode airflow to the stack is below a predetermined value.

* * * * *